(12) United States Patent
Kamada

(10) Patent No.: US 8,297,769 B2
(45) Date of Patent: Oct. 30, 2012

(54) ILLUMINATION DEVICE FOR DISPLAY DEVICE AND DISPLAY DEVICE WITH THE SAME

(75) Inventor: Kentaro Kamada, Kameyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 462 days.

(21) Appl. No.: 12/305,003

(22) PCT Filed: Apr. 26, 2007

(86) PCT No.: PCT/JP2007/059055
§ 371 (c)(1),
(2), (4) Date: Dec. 16, 2008

(87) PCT Pub. No.: WO2008/015831
PCT Pub. Date: Feb. 7, 2008

(65) Prior Publication Data
US 2009/0207585 A1 Aug. 20, 2009

(30) Foreign Application Priority Data
Aug. 3, 2006 (JP) .................................. 2006-212123

(51) Int. Cl.
*G09F 13/04* (2006.01)
(52) U.S. Cl. ...................... 362/97.1; 362/97.2; 362/97.4; 362/559; 362/561
(58) Field of Classification Search .................. 362/559, 362/561, 97.1, 97.2, 97.4, 217.01, 207.17
See application file for complete search history.

(56) References Cited

U.S. PATENT DOCUMENTS

| | | | |
|---|---|---|---|
| 5,971,567 A * | 10/1999 | Van Duijneveldt | 362/97.1 |
| 6,793,370 B2 * | 9/2004 | Moon et al. | 362/235 |
| 6,798,150 B2 * | 9/2004 | Moon | 315/169.3 |
| 7,281,812 B2 * | 10/2007 | Kim | 362/97.1 |
| 2003/0086255 A1 * | 5/2003 | Moon et al. | 362/97 |
| 2003/0214478 A1 | 11/2003 | Yoo et al. | |
| 2003/0231512 A1 * | 12/2003 | Bang et al. | 362/560 |

(Continued)

FOREIGN PATENT DOCUMENTS

JP 05-080333 A 4/1993

(Continued)

OTHER PUBLICATIONS

Official Communication issued in International Patent Application No. PCT/JP2007/059055, mailed on Aug. 14, 2007.

*Primary Examiner* — Danielle Allen
(74) *Attorney, Agent, or Firm* — Keating & Bennett, LLP

(57) ABSTRACT

An illumination device for a display device has cold cathode tube lamps capable of being driven in parallel, a first holding member having holders equivalent in number to the number of the cold cathode tube lamps and each holding one end of each lamp, a second holding member having holders equivalent in number to the number of the cold cathode tube lamps and each holding the other end of each lamp and an electric power source device. Harness lines connected to one end of the electric power source device and the first holding member are interconnected at multiple points, and harness lines connected to the other end of the electric power source device and the second holding member are interconnected at multiple points. This reduces uneven brightness. The illumination device for a display device can be used as backlight for a liquid crystal TV.

14 Claims, 6 Drawing Sheets

U.S. PATENT DOCUMENTS

| | | | |
|---|---|---|---|
| 2004/0156183 A1* | 8/2004 | Kim | 362/31 |
| 2005/0047173 A1* | 3/2005 | Kohno | 362/561 |
| 2005/0265047 A1* | 12/2005 | Yun et al. | 362/611 |
| 2006/0023471 A1* | 2/2006 | Ahn et al. | 362/613 |
| 2006/0120102 A1* | 6/2006 | Lim | 362/561 |
| 2006/0159987 A1* | 7/2006 | Kikuchi et al. | 429/121 |
| 2006/0197424 A1 | 9/2006 | Takata | |
| 2008/0002387 A1* | 1/2008 | Jung et al. | 362/29 |
| 2008/0002392 A1* | 1/2008 | Kim | 362/97 |
| 2009/0141208 A1* | 6/2009 | Byoun et al. | 349/58 |

FOREIGN PATENT DOCUMENTS

| | | |
|---|---|---|
| JP | 05-257143 A | 10/1993 |
| JP | 06-289363 A | 10/1994 |
| JP | 2000-047169 A | 2/2000 |
| JP | 2000-047208 A | 2/2000 |
| JP | 2002-132193 A | 5/2002 |
| JP | 2003-036723 A | 2/2003 |
| JP | 2004-039264 A | 2/2004 |
| WO | 2006/051698 A1 | 5/2001 |

* cited by examiner

ILLUMINATION DEVICE FOR DISPLAY DEVICE AND DISPLAY DEVICE WITH THE SAME

BACKGROUND OF THE INVENTION

1. Field of the Invention

The present invention relates to an illuminating device for a display device (hereinafter, "display-device illuminating device"), and to a display device. More particularly, the present invention relates to a display-device illuminating device provided with a plurality of lamps that can be driven in parallel, and also relates to a display device.

2. Description of the Related Art

Common cold cathode lamps used as light sources for display devices have a non-linear negative impedance characteristic, and accordingly cannot be driven in parallel. Thus, each cold cathode lamp is generally provided with a separate power supply circuit. This configuration, however, is costly since it requires as many power supply circuits as there are cold cathode lamps, and also is disadvantageous in terms of size reduction, weight reduction, and cost reduction.

Moreover, common cold cathode lamps used as light sources for display devices are connected to power supply circuits via harness leads (also simply called leads) and connectors. Therefore, their fitting is troublesome, resulting in poor assembly efficiency with display-device illuminating devices employing cold cathode lamps; likewise their removal also is troublesome, resulting in poor replacement efficiency at the time of replacement of cold cathode lamps, and in poor disassembly efficiency at the time of discarding of display-device illuminating devices employing cold cathode lamps.

Known as lamps free from such disadvantages are external electrode fluorescent lamps (EEFLs) (see, e.g., JP-A-2004-31338 and JP-A-2004-39264), and the cold cathode lamps for which the present applicant applied for a patent (see WO 2006/051698 A1).

An external electrode fluorescent lamp is, in terms of an equivalent circuit, a serial circuit with a capacitor connected to each end of a negative resistance, and has a nonlinear positive impedance characteristic; external electrode fluorescent lamps can therefore be driven in parallel. On the other hand, a circuit comprising a cold cathode lamp disclosed in WO 2006/051698 A1, a first power feeding member, and a second power feeding member, wherein the cold cathode lamp is fed with electric power from a power supply device via the first and second power feeding members, is, in terms of an equivalent circuit, a serial circuit with a capacitor connected to at least one end of a negative resistance, and therefore has a nonlinear positive impedance characteristic; thus the cold cathode lamp disclosed in WO 2006/051698 A1 can be driven in parallel.

These lamps, as discussed above, can be driven in parallel, and can be fed with electric power via holders made out of a resilient metal member (e.g. spring steel), with the holders, under the resilience thereof, pinching and holding end portions of the lamps. This construction is advantageous in terms of easy fitting and removal of the lamps.

As shown in FIG. 8, in a display-device illuminating device employing such lamps as discussed above that can be driven in parallel, one end of each lamp 11 is held with a holder 12 provided on a first holding member 13, and the other end of each lamp 11 is held with a holder 14 provided on a second holding member 15. The lamps 11 are each supplied with an alternating-current voltage having a frequency of several tens of kilohertz from a power supply device 16 via the first holding member 13 and the second holding member 15. There are provided as many of each of the holders 12 and 14, which are made out of a resilient metal member (e.g. spring steel) as there are lamps. An A-A' section of the second holding member 15 shown in FIG. 8 is as shown in FIG. 9A, and a B-B' section of the second holding member 15 shown in FIG. 8 is as shown in FIG. 9B. Note that the shape of the first holding member 13 is similar to that of the second holding member 15.

In the configuration shown in FIG. 8, as in other known art (e.g., see JP-A-2003-36723), a connecting point of the first holding member 13 and a harness lead 17, which is connected to one end of a power supply device 16, is provided at a bottom end portion of the first holding member 13, and a connecting point of the second holding member 15 and a harness lead 18, which is connected to the other end of the power supply device 16, is provided at a bottom end part of the second holding member 15. Therefore, the influence of a voltage drop resulting from an ohmic loss is greater the closer a lamp is located to the top of the first holding member 13 and the second holding member 15; thus the closer a lamp is located to the top of the first holding member 13 and the second holding member 15, the smaller the lamp current therethrough. This results in uneven brightness.

SUMMARY OF THE INVENTION

To overcome the above problems, preferred embodiments of the present invention provide a display-device illuminating device that offers more even brightness and provide a display device including such a display-device illuminating device.

A display-device illuminating device according to a preferred embodiment of the present invention includes a plurality of tube lamps capable of being driven in parallel, a first holding member having as many holders as there are tube lamps, the holders holding first ends of the tube lamps, and a power supply device, and is provided with two or more connecting points of harness leads connected to a first end of the power supply device and the first holding member.

With this configuration, the difference among the distances from the connecting points of the harness leads connected to one end of the power supply device and the first holding member to each of the tube lamps can be reduced, and thus it is possible to obtain more even brightness. For example, in a case where the connecting points of the harness leads connected to one end of the power supply device and the first holding member are provided at the top and bottom ends of the first holding member, the difference among the distances from the connecting points of the harness leads connected to one end of the power supply device and the first holding member to each of the tube lamps is halved compared with in the configuration shown in FIG. 8.

In a case where the tube lamps capable of being driven in parallel are such that their other ends can be held directly with holders, there may be additionally provided a second holding member having as many holders as there are tube lamps, the holder holding the other ends of the tube lamps, and two or more connecting points of the harness leads connected to the other end of the power supply device and the second holding member.

In the display-device illuminating device according to a preferred embodiment of the present invention with the above described configuration, it is preferable that the lengths of the harness leads provided between one end of the power supply device and the first holding member are equal. In a case where the above-mentioned second holding member is provided, it is preferable that the lengths of the harness leads provided between the other end of the power supply device and the second holding member are equal.

This configuration helps to eliminate the difference among the lamp currents through the individual lamps owing to the ohmic loss across the harness leads.

In the display-device illuminating device according to a preferred embodiment of the present invention with the above described configuration, the first holding member may be replaced with a first power feeding portion having as many first power feeding members as there are tube lamps, the first power feeding members being conductive members that do not make contact with the tube lamps, and the circuit formed by the tube lamps and the first power feeding member may form, in terms of an equivalent circuit, a serial circuit with a capacitor connected to one end of a negative resistance. In a case where the display-device illuminating device according to a preferred embodiment of the present invention with the above described configuration is provided with the second holding member, the second holding member may be replaced with a second power feeding portion having as many second power feeding members as there are tube lamps, the second power feeding members being conductive members that does not make contact with the tube lamps, and the circuit formed by the tube lamp, the first power feeding member, and the second power feeding member may form, in terms of an equivalent circuit, a serial circuit with a capacitor connected to each end of a negative resistance.

A display device according to a preferred embodiment of the present invention (e.g. a television receiver) preferably includes any of the above described display-device illuminating devices.

According to various preferred embodiments of the present invention, it is possible to realize display-device illuminating devices with more even brightness and display devices provided therewith.

These and other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the present invention will be described below with reference to the accompanying drawings. One example of a configuration of a display-device illuminating device according to a preferred embodiment of the present invention is shown in FIG. 1.

Figure 1:
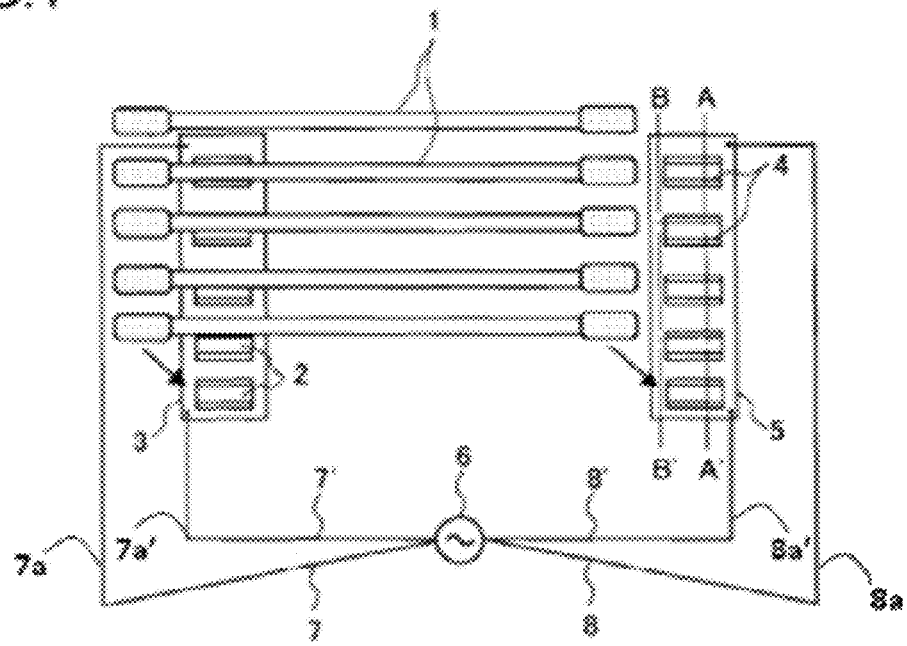
FIG. 1 is a diagram showing an example of the configuration of a display-device illuminating device according to a preferred embodiment of the present invention.
Figure 2A:
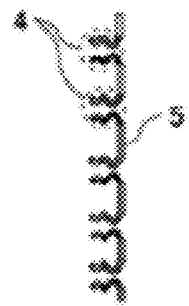
FIG. 2A is a diagram showing a sectional shape of a second holding member provided in the display-device illuminating device shown in FIG. 1.
Figure 2B:
FIG. 2B is a diagram showing a sectional shape of a second holding member provided in the display-device illuminating device shown in FIG. 1.

The display-device illuminating device shown in FIG. 1 includes a plurality of tube lamps 1 that can be driven in parallel; a first holding member 3 that has as many holders 2 as there are tube lamps, the holders 2 holding one ends of the tube lamps 1 respectively; a second holding member 5 that has as many holders 4 as there are tube lamps, the holders 4 holding the other ends of the tube lamps 1 respectively; and a power supply device 6. The lamps 1 are each supplied with an alternating-current voltage having a frequency of several tens of kilohertz from the power supply device 6 via the first holding member 3 and the second holding member 5. There are provided as many of each of the holders 2 and 4, which are made out of a resilient metal member (e.g. spring steel) as there are lamps. An A-A' section of the second holding member 5 shown in FIG. 1 is as shown in FIG. 2A, and a B-B' section of the second holding member 5 shown in FIG. 1 is as shown in FIG. 2B. Note that the shape of the first holding member 3 is similar to that of the second holding member 5.

The display-device illuminating device shown in FIG. 1 includes an optical sheet; and an illuminating unit; that is provided with the first holding member 3, and the second holding member 5, that has the tube lamps fitted on a front surface thereof, and that has the power supply device 6 arranged at a rear surface thereof. This results in a construction in which the optical sheet covers the front surface of the illuminating unit with the tube lamps 1 fitted thereon.

A first end of a harness lead 7 is directly electrically connected to one end of a power supply device 6 and a second end of the harness lead 7 is directly electrically connected to one end of the first holding member 3 at the top end of the first holding member 3. The harness lead 7 includes a middle portion 7a that is directly connected to the first end and the second end of the harness lead 7. A first end of a harness lead 7' is directly electrically connected to the one end of the power supply device 6 and a second end of the harness lead 7' is directly electrically connected to another end of the first holding member 3 at the bottom end of the first holding member 3. The harness lead 7' includes a middle portion 7a' that is directly connected to the first end and the second end of the harness lead 7'. Also, a first end of a harness lead 8 is directly electrically connected to a second end of the power supply device 6 and a second end of the harness lead 8 is directly electrically connected to one end of the second holding member 5 at the top end of the second holding member 5. The harness lead 8 includes a middle portion 8a that is directly connected to the first end and the second end of the harness lead 8. A first end of a harness lead 8' is directly electrically connected to the second end of the power supply device 6 and a second end of the harness lead 8' is directly electrically connected to another end of the second holding member 5 and a harness lead 8' at the bottom end of the second holding member 5. The harness lead 8' includes a middle portion 8a' that is directly connected to the first end and the second end of the harness lead 8'.

Figure 8:
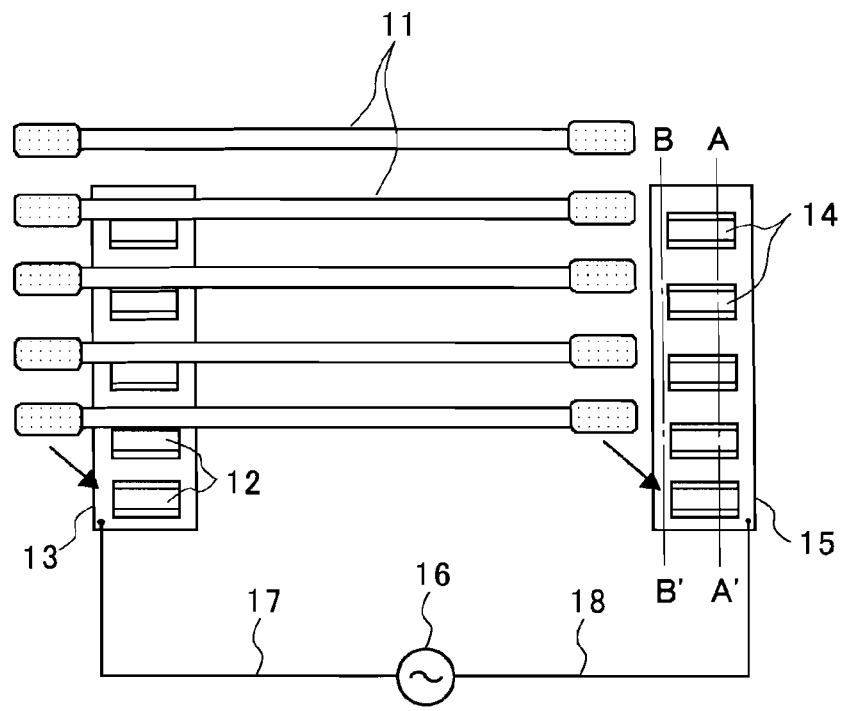
FIG. 8 is a diagram showing an example of the equivalent circuit of a conventional display-device illuminating device.
Figure 9A:
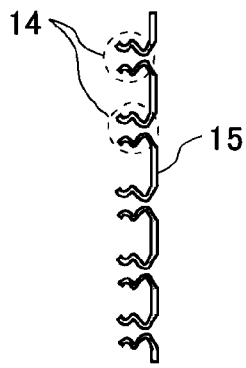
FIG. 9A is a diagram showing a sectional shape of a second holding member provided in the display-device illuminating device shown in FIG. 8.
Figure 9B:
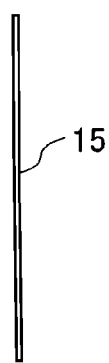
FIG. 9B is a diagram showing a sectional shape of a second holding member provided in the display-device illuminating device shown in FIG. 8.

With this configuration, the difference among the distances from the connecting points of the first holding member 3 and the harness leads 7 and 7', which are connected to one end of the power supply device 6, to one ends of the tube lamps 1 is approximately halved as compared with the difference, in the configuration shown in FIG. 8, among the distances, from the connecting point of the first holding member 13 and the harness lead 17, which is connected to one end of a power supply device 16, to one ends of the tube lamps 11, and, the difference among the distances from the connecting points of the second holding member 5 and the harness leads 8 and 8', which are connected to the other end of the power supply device 6, to the other ends of the tube lamps 1 is approximately halved as compared with the difference, in the configuration shown in FIG. 8, among the distances, from the connecting points of the second holding member 15 and the harness lead 18, which is connected to the other end of the power supply device 16, to the other ends of the tube lamps 11, and thus the difference of the lamp-current in the tube lamps 1 is reduced. In this way, it is possible to obtain more even brightness.

Figure 3:
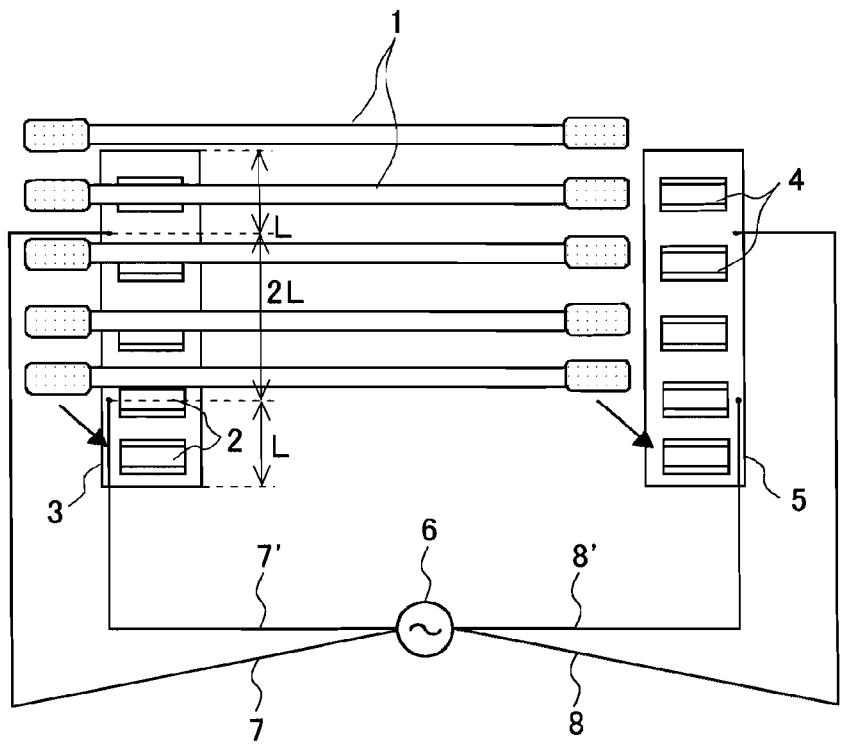
FIG. 3 is a diagram showing another example of the configuration of a display-device illuminating device according to a preferred embodiment of the present invention.

Note that, the positions of the connecting points of the first holding member 3 and the harness leads 7 and 7', which are connected to one end of the power supply device 6, and the positions of the connecting points of the second holding member 5 and the harness leads 8 and 8', which are connected to the other end of the power supply device 6, may be modified as the configuration shown in FIG. 3. In this configuration, the difference among the distances from the connecting points of the first holding member 3 and the harness leads 7 and 7', which are connected to one end of the power supply device 6, to one ends of the tube lamps 1 is reduced approximately to one-fourth as compared with the difference, in the configuration shown in FIG. 8, among the distances from the connecting point of the first holding member 13 and the harness lead 17, which is connected to one end of the power supply device 16, to one ends of the tube lamps 11, and the difference among the distances from the connecting points of the second holding member 5 and the harness leads 8 and 8', which are connected to the other end of the power supply device 6, to the other ends of the tube lamps 1 is reduced approximately to one-fourth as compared with the difference, in the configuration shown in FIG. 8, among the distances from the connecting point of the second holding member 15 and the harness lead 18, which is connected to the other end of the power supply device 16, to the other ends of the tube lamps 11. Thus, it is possible to obtain still more even brightness.

Figure 4:
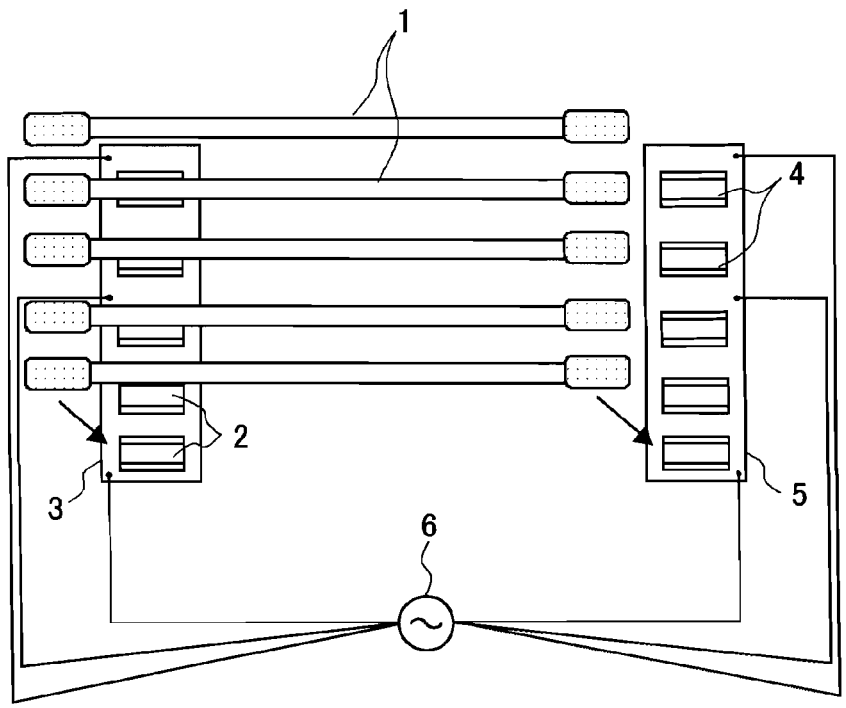
FIG. 4 is a diagram showing yet another example of the configuration of a display-device illuminating device according to a preferred embodiment of the present invention.

The number of connecting points of the first holding member 3 and the harness lead, leads that are connected to one end of the power supply device 6, and the number of connecting points of the second holding member 5 and the harness lead, leads that are connected to the other end of the power supply device 6, are not restricted to two, and, for example, three of each may be provided as shown in FIG. 4. The larger the number of connecting points, the more even the brightness obtained, but simultaneously the larger the number of harness leads, lessening the effect of the reduction in the number of harness leads owing to parallel driving. Preferably, with this taken into consideration, the number of connecting points is determined.

In a case where the material of the first holding member and the second holding member has a higher specific resistance than the material of the harness leads, for example, in a case where the material of the harness leads is copper (with a specific resistance of $1.55 \times 10^{-8}$ $\Omega \cdot m$ at $0°$ C.), and the material of the first holding member and the second holding member is bronze (with a specific resistance of $13.6 \times 10^{-8}$ $\Omega \cdot m$ at $0°$ C.), or in a case where the shape of the first holding member and the second holding member is such as to have a higher resistance than the shape of the harness leads, the influence of the ohmic loss across the harness leads on the lamp current through each of the lamps is small; thus, even in a configuration where, as in the display-device illuminating device shown in FIG. 1, the lengths of the harness leads 7 and 7' are different and the lengths of the harness leads 8 and 8' are different, more even brightness can be obtained.

However, in order to prevent the lamp current through each lamp from varying as a result of the ohmic loss across the harness leads, it is preferable, in the configurations shown in FIG. 1, FIG. 3 and FIG. 4, that the lengths of the harness leads provided between one end of the power supply device 6 and the first holding member 3 be equal, and the lengths of the harness leads provided between the other end of the power supply device 6 and the second holding member 5 be equal.

A description will now be given of examples of the configuration of the tube lamps 1 and the holders 2 and 4 provided in the display-device illuminating device shown in FIG. 1.

Figure 5A:
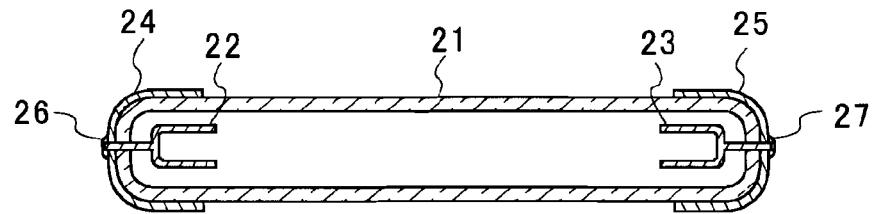
FIG. 5A is a diagram showing an example of the configuration of a tube lamp provided in a display-device illuminating device according to a preferred embodiment of the present invention.
Figure 5B:
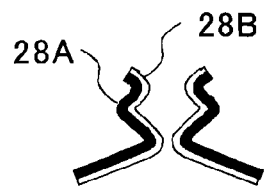
FIG. 5B is a diagram showing an example of the configuration of a holder provided in a display-device illuminating device according to a preferred embodiment of the present invention.

One example of the configuration of the tube lamps 1 and the holders 2 and 4 provided in the display-device illuminating device according to a preferred embodiment of the present invention are a cold cathode lamp having a sectional structure as shown in FIG. 5A and a holder as shown in FIG. 5B.

The cold cathode lamp shown in FIG. 5A has internal electrodes 22 and 23 inside a glass tube 21. Portions of the internal electrodes 22 and 23 penetrate and protrude out of the glass tube 21, and serve as an electrode terminal. In this configuration, the interior of the glass tube 21 is air-tight. The inner wall of the glass tube 21 is coated with a fluorescent substance. Inside the air-tight glass tube 21, neon and argon are preferably sealed therein in a ratio of 95:5, 80:20, etc. such that the overall pressure inside the glass tube 21 is, for example, approximately $10.7 \times 10^3$ to $5.3 \times 10^3$ Pa ($\approx 80$ to $40$ Torr), and in addition several milligrams of mercury is enclosed. In some cases, xenon is sealed in instead of mercury.

In the cold cathode lamp shown in FIG. 5A, an external electrode 24 is provided on an internal electrode 22-side end portion of the glass tube 21, and the protruding portion of the internal electrode 22 and the external electrode 24 are soldered together with solder 26; an external electrode 25 is provided on an end portion on the internal electrode 23-side of the glass tube 21, and the protruding portion of the internal electrode 23 and the external electrode 25 are soldered together with solder 27. Specific implementations of the external electrodes 24 and 25 include metal paste, metal foil, metal cap, and the like. As long as the electrical connection between the protruding portion of the internal electrode 22 and the external electrode 24 is sufficiently secured, the solder 26 may be omitted; as long as the electrical connection between the protruding portion of the internal electrode 23 and the external electrode 25 is sufficiently secured, the solder 27 may be omitted.

The holder shown in FIG. 5B is a resilient metal member 28A coated with an insulating layer 28B, and pinches and holds the external electrode of the cold cathode lamp shown in FIG. 5A under the resilience of the resilient metal member 28A. The insulating layer 28B coated on the resilient metal member 28A has simply to be formed such that the resilient metal member 28A and the external electrode of the cold cathode lamp does not make direct contact with each other.

Figure 5C:
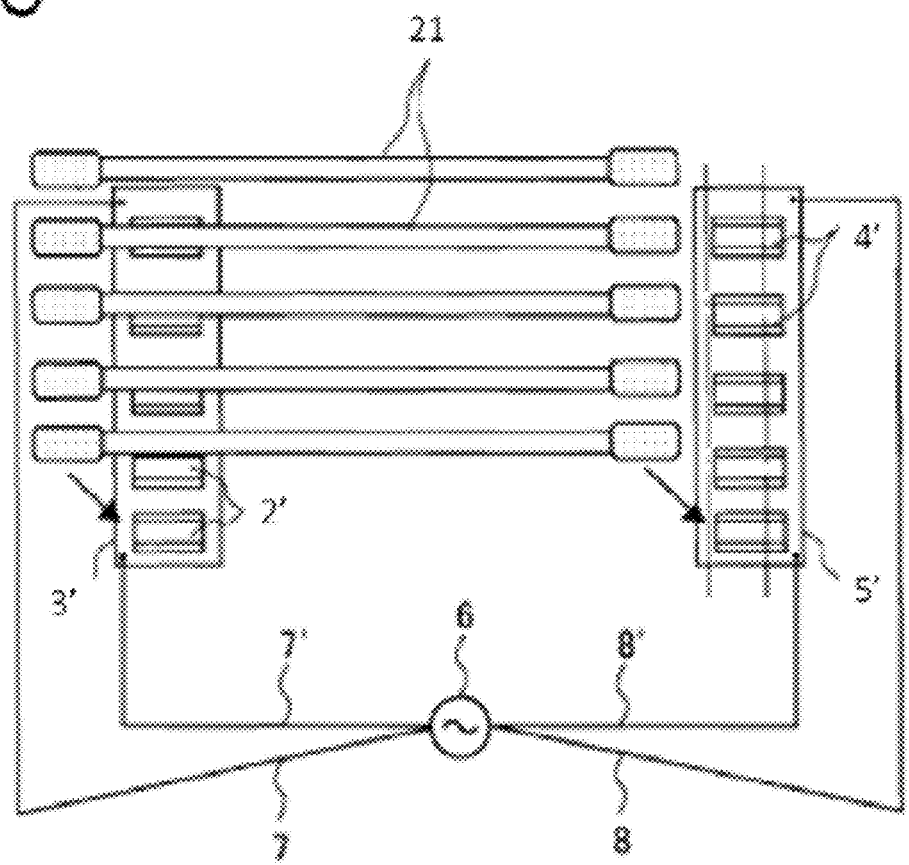
FIG. 5C is a diagram showing an example of the configuration of a display-device illuminating device according to a preferred embodiment of the present invention.

As shown in FIG. 5C, instead of the holder 2, a first power feeding member 2' which is a conductive member that does not make contact with the external electrode 24 of the cold cathode lamp may be used, and instead of the holder 4, a second power feeding member 4' which is a conductive member that does not make contact with the external electrode 24 of the cold cathode lamp may be used, and the illuminating unit may be provided with a holding portion which holds the cold cathode lamp such that the external electrode 24 of the cold cathode lamp and the first power feeding member 2' form a capacitor, and that the external electrode 25 of the cold cathode lamp and the second power feeding member 4' define a capacitor. In other words, the first holding member 3 may be replaced with a first power feeding portion 3' provided with as many first power feeding members 2' as there are cold cathode lamps 21, the first power feeding members 2' each being a conducting member that does not make contact with the external electrode 24 of the cold cathode lamp; the second holding member 5 may be replaced with a second power feeding portion 5' provided with as many second power feeding members 4' as there are cold cathode lamps, the second power feeding members 4' each being a conducting member that does not make contact with the external electrode 25 of the cold cathode lamp; and the circuit defined by the cold cathode lamp 21, the first power feeding member 2', and the second power feeding member 4' may be, in terms of an equivalent circuit, a serial circuit with a capacitor connected to each end of a negative resistance. However, this implementation suffers from the problem that the interelectrode distance of the capacitor defined by the external electrode 24 of the cold cathode lamp and the first power feeding member and the interelectrode distance of the capacitor defined by the external electrode 25 of the cold cathode lamp and the second power feeding member are unstable, and the problem that there may occur electric discharge between the external electrode 24 of the cold cathode lamp 21 and the first power feeding member 2', and between the external electrode 25 of the cold cathode lamp and the second power feeding member 4'. Thus, the configuration, which includes a resilient metal member 28A coated with an insulating layer 28B shown in FIG. 5B is preferable for use as the first power feeding member 2' and the second power feeding member 4'.

Figure 6A:
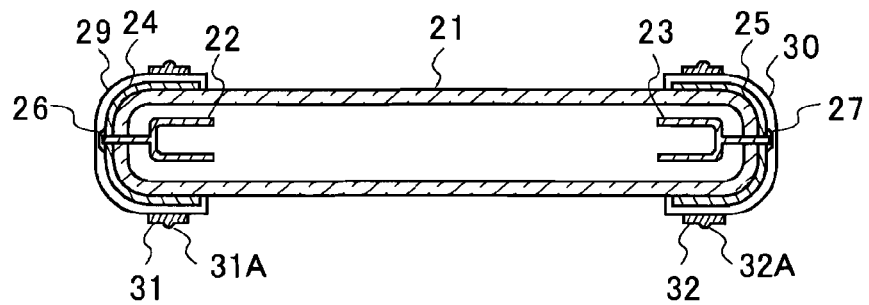
FIG. 6A is a diagram showing another example of the configuration of a tube lamp provided in a display-device illuminating device according to a preferred embodiment of the present invention.
Figure 6B:
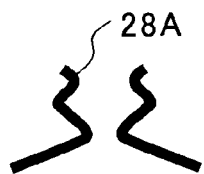
FIG. 6B is a diagram showing another example of the configuration of a holder provided in a display-device illuminating device according to a preferred embodiment of the present invention.

Another example of the configuration of the tube lamps 1 and the holders 2 and 4 provided in the display-device illuminating device according to a preferred embodiment of the present invention are a cold cathode lamp with a section structure as shown in FIG. 6A and a holder shown in FIG. 6B. Such elements shown in FIGS. 6A and 6B as find their counterparts in FIGS. 5A and 5B are identified by common reference signs, and no detailed description of them will be repeated.

In the cold cathode lamp shown in FIG. 6A, an insulating layer 29 is disposed on the external electrode 24, an insulating layer 30 is disposed on the external electrode 25, a strip-ring-shaped counter electrode 31 is disposed on the insulating layer 29, and a strip-ring-shaped counter electrode 32 is disposed on the insulating layer 30. The external electrode 24 as a whole is covered with the glass tube 21 and the insulating layer 29, and the external electrode 25 as a whole is covered with the glass tube 21 and the insulating layer 30.

Moreover, in the cold cathode lamp shown in FIG. 6A, a ring-shaped projecting portion 31A is disposed on the strip-ring-shaped counter electrode 31 to ensure electrical connection between the counter electrode 31 and the holder shown in FIG. 6B, and a ring-shaped projecting portion 32A is disposed on the strip-ring-shaped counter electrode 32 to ensure the electrical connection between the counter electrode 32 and the holder shown in FIG. 6B.

The holder shown in FIG. 6B is a resilient metal member 28A, and pinches and holds the projecting portion of the counter electrode of the cold cathode lamp shown in FIG. 6A under the resilience of the resilient metal member 28A.

An external electrode fluorescent lamp may be used instead of the cold cathode lamp shown in FIG. 6A.

In both of the two examples of configuration described above, the circuit defined by the tube lamp 1 and the holders 2 and 4 is, in terms of an equivalent circuit, a serial circuit composed of a negative resistance, a capacitor connected to one end of the negative resistance, and a capacitor connected to the other end of the negative resistance.

Also in a case where the circuit defined by the tube lamp 1 and the holders 2 and 4 is, in terms of an equivalent circuit, a serial circuit composed of a negative resistance and a capacitor connected to one end of the negative resistance (for example, in a case where the tube lamp 1 and the holders 2 and 4 are the cold cathode lamp with the sectional structure shown in FIG. 5A, a holder with the structure shown in FIG. 5B, and a holder with the structure shown in FIG. 6B), preferred embodiments of the present invention are applicable. In a case where each lamp is configured as the cold cathode lamp with the sectional structure shown as FIG. 5A but with the external electrode 25 and the solder 27 omitted, the second holding member 5 may be omitted, and the other end of the power supply device 6 may be connected with the end portion of the internal electrode 23 by a harness lead.

A display-device illuminating device according to a preferred embodiment of the present invention may, for example, be provided with a plurality of units including, for example, the tube lamps 1, the first holding member, the second holding member 5, the power supply device 6, and the harness leads 7, 7', 8, and 8' shown in FIG. 1. In this way, it is possible to adapt to large-screen display devices easily.

A display device according to a preferred embodiment of the present invention includes a display-device illuminating device according to another preferred embodiment of the present invention as described above and a display panel. Specific implementations of a display device according to various preferred embodiments of the invention include, for example, a transmission liquid crystal display device using a display-device illuminating device according to a preferred embodiment of the present invention as a backlighting unit and having a liquid crystal display panel provided at the front side thereof.

Figure 7:
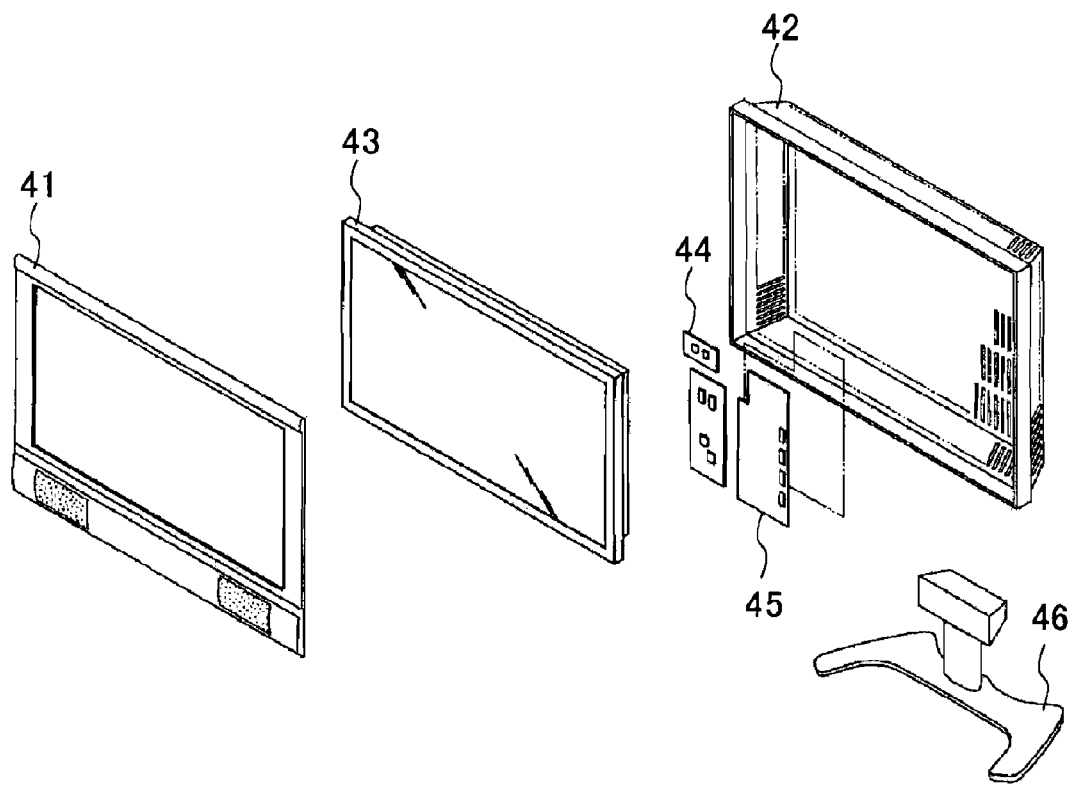
FIG. 7 is a diagram showing an exploded perspective view of a liquid crystal television receiver which is one example of a display device according to a preferred embodiment of the present invention.

FIG. 7 shows an example of an exploded perspective view of a display device according to a preferred embodiment of the present invention in a case where it is a liquid crystal television receiver. A transmission liquid crystal display portion 43, a tuner 44, and a power supply 45 are enclosed in between a front cabinet 41 and a rear cabinet 42, and the rear cabinet 42 is held on a stand 46. The transmission liquid crystal display portion 43 uses the display-device illuminating device according to a preferred embodiment of the present invention as a backlighting unit, and has the liquid crystal display panel provided at the front side thereof.

Display-device illuminating devices according to a preferred embodiment of the present invention can be applied as devices for various display devices, including backlights for liquid crystal television receivers.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display-device illuminating device comprising:
   a plurality of tube lamps capable of being driven in parallel;
   a first holding member having a same number of holders as a number of the tube lamps, the holders holding first ends of the tube lamps;
   a power supply device; and
   first harness leads, each first harness lead including:
      a first end directly electrically connected to a first end of the power supply device;
      a second end directly electrically connected to a corresponding connecting point of the first holding member; and
      a middle portion other than the first and second ends of the first harness leads that is directly connected to both the first and second ends of the first harness leads.

2. The display-device illuminating device according to claim 1, further comprising:
   a second holding member having a same number of holders as the number of the tube lamps, the holders holding second ends of the tube lamps; and
   second harness leads, each second harness lead including:
      a first end directly electrically connected to a second end of the power supply device;
      a second end directly electrically connected to a corresponding connecting point of the second holding member; and
      a middle portion other than the first and second ends of the second harness leads that is directly connected to both the first and second ends of the second harness leads.

3. The display-device illuminating device according to claim 2, wherein lengths of the first harness leads are equal, and lengths of the second harness leads are equal.

4. The display-device illuminating device according to claim 1, wherein lengths of the first harness leads are equal.

5. A display device comprising the display-device illuminating device according to claim 1.

6. The display device according to claim 5, wherein the display device is a television receiver.

7. A display-device illuminating device comprising:
   a plurality of tube lamps capable of being driven in parallel;
   a first power feeding portion including a same number of first power feeding members as the number of the tube lamps, the first power feeding members being defined by conducting members not making contact with the tube lamps, and a circuit defined by the tube lamps and the first power feeding members is a serial circuit with a capacitor connected to one end of a negative resistance; and
   a power supply device; wherein
   two or more connecting points of harness leads connected to a first end of the power supply device and the first power feeding portion are provided.

8. The display-device illuminating device according to claim 7, wherein lengths of the harness leads provided between the first end of the power supply device and the first power feeding portion are equal.

9. A display device comprising the display-device illuminating device according to claim 7.

10. The display device according to claim 9 wherein the display device is a television receiver.

11. A display-device illuminating device comprising:
   a plurality of tube lamps capable of being driven in parallel;
   a first power feeding portion including a same number of first power feeding members as the number of the tube lamps, the first power feeding members being defined by conducting members not making contact with the tube lamps;
   a second power feeding portion including a same number of second power feeding members as the number of the tube lamps, the second power feeding members being defined by conducting members not making contact with the tube lamps;
   a circuit defined by the tube lamps, the first power feeding members, and the second power feeding members is a serial circuit with a capacitor connected to each end of a negative resistance; and
   a power supply device; wherein
   two or more connecting points of harness leads connected to a first end of the power supply device and the first power feeding portion are provided; and
   two or more connecting points of harness leads connected to a second end of the power supply device and the second power feeding portion are provided.

12. The display-device illuminating device according to claim 11, wherein lengths of the harness leads provided between the first end of the power supply device and the first power feeding portion are equal, and lengths of the harness leads provided between the second end of the power supply device and the second power feeding portion are equal.

13. A display device comprising the display-device illuminating device according to claim 11.

14. The display device according to claim 13, wherein the display device is a television receiver.

* * * * *